United States Patent
Griffin et al.

(10) Patent No.: US 7,896,435 B2
(45) Date of Patent: Mar. 1, 2011

(54) SEAT ASSEMBLY FOR SENSING AN OCCUPANT

(75) Inventors: Dennis P. Griffin, Noblesville, IN (US); Mark C. Hansen, Kokomo, IN (US); William W. Fultz, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 200 days.

(21) Appl. No.: 12/218,083

(22) Filed: Jul. 11, 2008

(65) Prior Publication Data

US 2010/0007184 A1 Jan. 14, 2010

(51) Int. Cl.
*A47C 31/12* (2006.01)
(52) U.S. Cl. .................. 297/217.2; 297/217.3; 180/273
(58) Field of Classification Search ............... 297/217.2, 297/217.3; 180/273
See application file for complete search history.

(56) References Cited

U.S. PATENT DOCUMENTS

| | | | | |
|---|---|---|---|---|
| 4,266,616 A * | 5/1981 | Mueller, Jr. ..................... | 172/7 |
| 6,129,168 A | 10/2000 | Lotito et al. | |
| 6,648,092 B2 * | 11/2003 | Michaud et al. ............. | 180/272 |
| 7,230,419 B2 | 6/2007 | Godoy et al. | |
| 7,240,962 B2 * | 7/2007 | Kim ........................ | 297/217.3 |
| 2007/0028702 A1 | 2/2007 | Sakamoto et al. | |

FOREIGN PATENT DOCUMENTS

EP 1281942 2/2003

* cited by examiner

*Primary Examiner*—Anthony D Barfield
(74) *Attorney, Agent, or Firm*—Thomas N. Twomey

(57) ABSTRACT

A seat assembly is provided that can be sat upon by an occupant that detects the weight of the occupant. The seat assembly includes a seat cushion, a rotary sensor, and a linkage having a tip. The seat cushion deforms in response to the weight. The rotary sensor has a shaft that rotates about an axis and has an electrical output that is proportional to the angle of rotation of the shaft. The linkage underlies the seat surface and connects the seat surface to the shaft of the rotary sensor. As weight is placed on the seat the seat cushion deforms in response to the weight moving the tip and the linkage. The movement of the linkage rotates the shaft, which in turn, provides an electrical output that is proportional to the weight.

14 Claims, 2 Drawing Sheets

SEAT ASSEMBLY FOR SENSING AN OCCUPANT

TECHNICAL FIELD

This invention relates to a seat assembly adapted for detecting a weight of an occupant. More particularly, this invention relates to a seat assembly that includes a rotary sensor operatively connected to the seat surface and having an electrical output proportional to deformation of the seat surface in response to the weight of the occupant.

BACKGROUND OF INVENTION

In an automotive vehicle, it is desired, in the event of a collision, to deploy the air bag to protect an adult occupant in the seat. However, it is not desired to deploy the air bag when the seat is empty. Also, it may be desirable not to deploy the air bag when the seat is occupied by a child in a car seat. For the purpose of determining whether the seat is occupied by an adult, by a car seat, or some other object, a sensor is commonly included in the seat to detect the weight of the occupant. A common sensor device uses a bladder containing a fluid and a pressure sensor for determining the pressure of the fluid, where the pressure of the fluid is proportional to the weight of the occupant. Fluid needs to be injected into the bladder, and the bladder needs to be sealed, adding cost to the assembly. The inclusion of the pressure sensor also adds cost to the assembly. There is additional cost in incorporating the entire assembly into the seat. Servicing the common sensor device often requires removal of the vehicle seat along with replacement of the seat cushion to access and replace the bladder and pressure sensor assembly.

Therefore, what is needed is an improved seat assembly for sensing a weight of an occupant that is made of low cost components, is readily incorporated into the seat while maintaining the comfort of the occupant, is reliable to provide an output proportional to the weight, and is conveniently located for serviceability.

SUMMARY OF THE INVENTION

In accordance with this invention, a seat assembly is provided that is adapted to be sat upon by an occupant and detects the weight of the occupant. The seat assembly comprises a seat cushion having a surface that deforms in response to the weight in the seat. The assembly includes a rotary sensor having a shaft that rotates about an axis and has an electrical output that is proportional to the angle of rotation of the shaft. A linkage having a tip underlying the seat surface connects the seat surface to the shaft. Deformation of the seat surface in response to a weight moves the tip and the linkage. The movement of the linkage rotates the shaft, which in turn provides an electrical output that is proportional to the weight.

BRIEF DESCRIPTION OF THE DRAWINGS

The present invention's features will become apparent to those skilled in the art from reading the accompanying drawings, in which.

DETAILED DESCRIPTION OF THE PREFERRED EMBODIMENT

Figure 1:
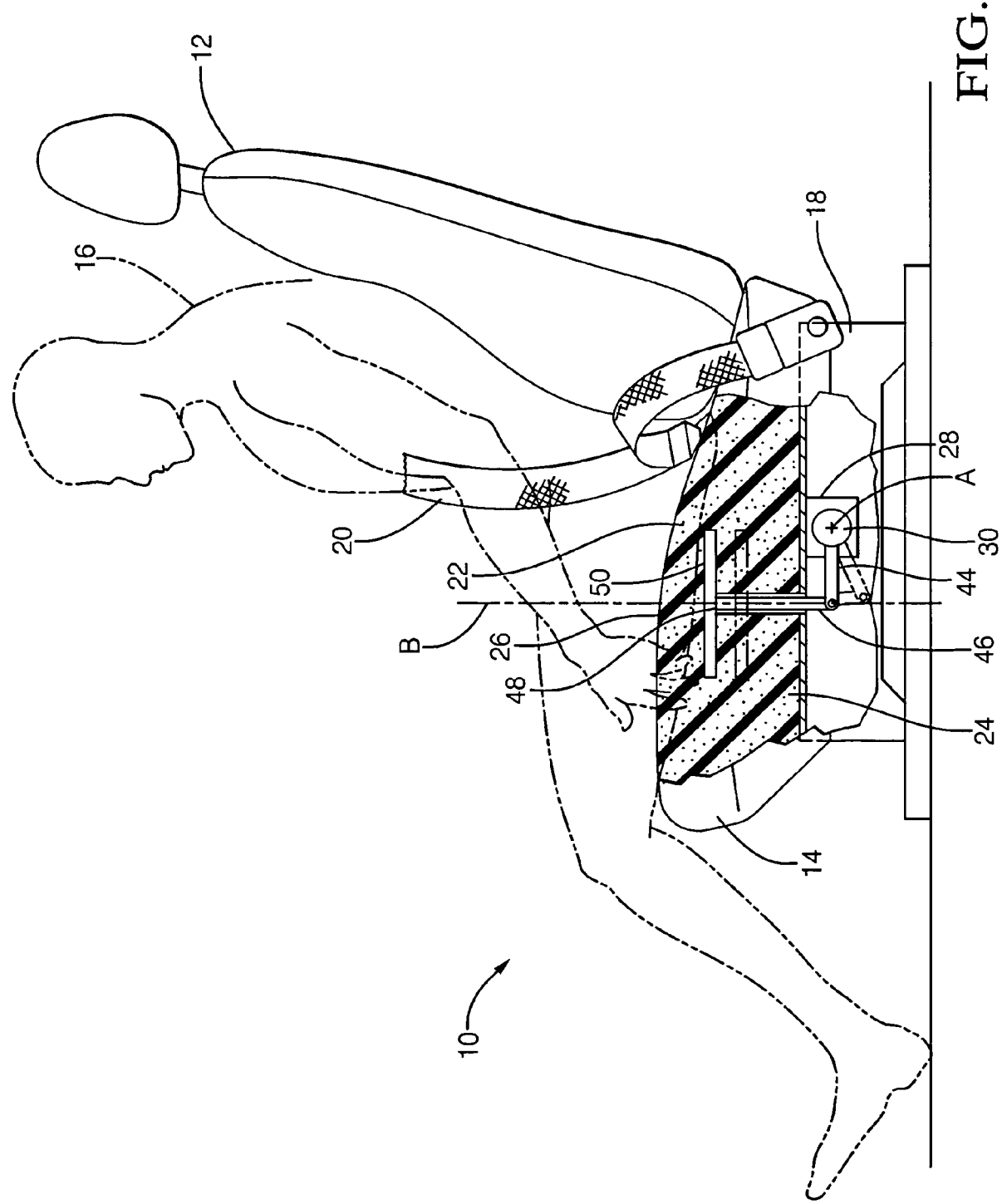
FIG. 1 is a view in cross section of a seat assembly in accordance with this invention.

Referring to FIG. 1, a seat assembly 10 in accordance with a preferred embodiment of this invention is provided for an automotive vehicle and includes a seat 12 containing a seat cushion 14 for seating an occupant 16. Seat assembly 10 is adapted to be sat upon by occupant 16. Cushion 14 is mounted to the vehicle chassis (not shown) by a seat frame 18. As depicted in FIG. 1, occupant 16 is an adult belted into seat 12 using a seat belt 20. Alternately, the occupant may be a car seat for holding a child, or an object such as grocery items contained in a grocery bag, which typically weigh less than the adult occupant. It is desired to detect and distinguish an adult occupant from a child car seat, a child car seat that contains an occupant, or an object like a grocery bag.

Cushion 14 has an upper cushion surface 22 and a lower cushion surface 24. Cushion 14 is formed of a material that compresses in response to the weight of occupant 16. A suitable material for cushion 14 includes polymeric foam, such as polyethylene or polyurethane foam. Cushion 14 includes a covering of a seat surface 26, typically of fabric or leather, which forms upper cushion surface 22. When occupant 16 sits on surface 26 of cushion 14, surface 26 deforms to accommodate the weight of occupant 16 as shown by the dashed lines in FIG. 1 on upper cushion surface 22. Typically, the amount of deformation of upper cushion surface 22 in response to a weight is proportional to the weight. Thus, a heavy weight caused by an adult occupant 16 deforms upper cushion surface 22 more than a light weight, such as a child car seat or a bag of groceries.

Figure 2:
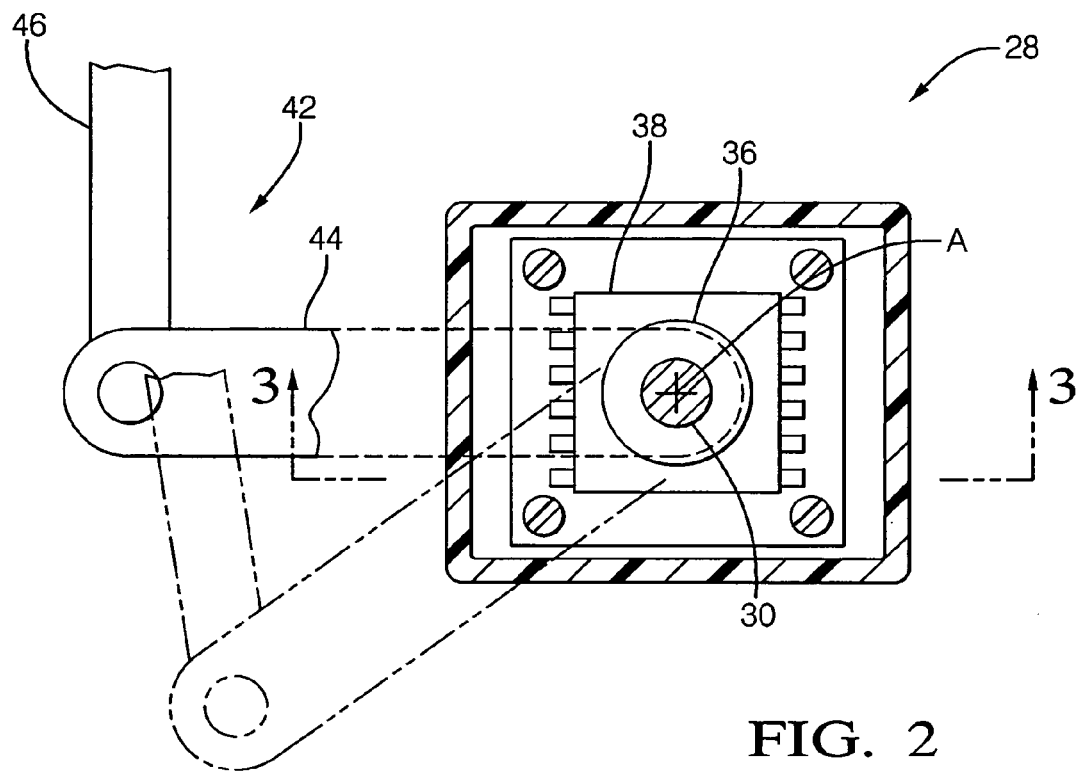
FIG. 2 is a view in cross section of the rotary sensor in FIG. 1 taken substantially along the line 2-2 of FIG. 3.
Figure 3:
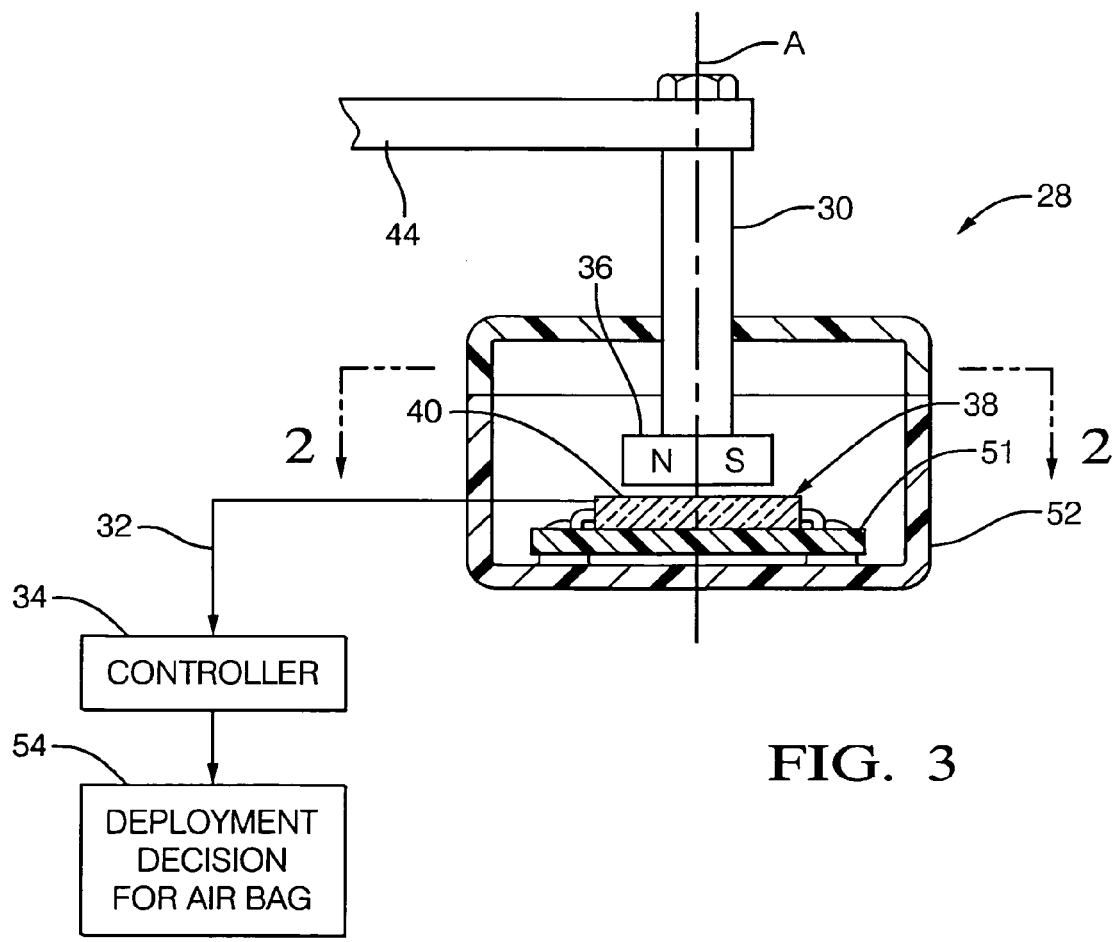
FIG. 3 is a view in cross section of the rotary sensor in FIG. 2 taken substantially along the line 3-3 of FIG. 2.

Seat assembly 10 includes a rotary sensor 28 that is mounted adjacent to lower cushion surface 24 to frame 18 via screws or other suitable fastener. Rotary sensor 28 contains a shaft 30, as depicted in FIGS. 1-3, that moves, or rotates about an axis A. Rotary sensor 28 produces an electrical output 32 proportional to an angle of rotation of shaft 30. Electrical output 32 connects to a controller 34.

In this embodiment, shaft 30 contains a magnet 36 having a circular shape, mounted on shaft 30 that moves in response to the angle of rotation of shaft 30. A sensing element 38, which is stationary at a distance and height from magnet 36 and relevant to the rotary movement of shaft 30, is suitable for detecting rotation movement of magnet 36 as depicted in FIG. 3. Rotation of shaft 30 changes the north/south magnet polarity relative to sensing element 38. The preferred sensing element 38, is a Hall Effect sensor 40 that detects the change in rotation of magnet 36 and generates electrical output 32, which is a voltage, in response.

Other sensing elements may be suitable that use inductive, capacitive, magnetoresistive/magnetostrictive measurements to determine rotation of the shaft and provide an electrical output indicative thereof. In an alternate embodiment, a suitable measurement is made using a non-contacting resistive potentiometer. While the described embodiment has a rotary sensor with an electrical output that is a voltage value, the output may be a resistance or a digital signal.

A suitable rotary sensor sensing element is commercially available from Triaxis Hall Technology under the trade designation Melexis MLX90316. In this particular embodiment, the commercially available rotary sensor sensing element would be mounted in the housing of the rotary sensor such that the circular magnet on the shaft is in proximity to the sensing element at a distance and height within tolerances specified by the rotary sensing element manufacturer.

Seat assembly 10 includes a linkage 42 that connects to shaft 30. Linkage 42 is routed up through cushion 14. A clearance slot is made in frame 18 to allow unobtrusive movement of linkage 42. Linkage 42 includes an arm 44 that is connected to a rod 46. Arm 44 is perpendicularly affixed to shaft 30 of rotary sensor 28. Rod 46 has an upper end, or a tip 48, which includes an accumulator 50 disposed underlying upper cushion surface 22.

While the preferred embodiment shows a linkage made of a rod and arm that move in relation to each other in response to the weight, the rod and arm may be such that there is a fixed fulcrum point any where along the rod or arm. An alternate embodiment may have a rod and arm constructed as a single element that moves in response to the weight that rotates the shaft.

Linkage 42 with accumulator 50 are inserted into cushion 14 through a slit made in lower cushion surface 24. As weight is applied to surface 26, cushion 14 moves in response to deformation of surface 26 and accumulator 50, tip 48, and linkage 42 are forced downward along an axis B rotating shaft 30. The rotation of shaft 30 is detected by sensor element 38 in rotary sensor 28 and an electrical output 32 is produced. Electrical output 32 is a voltage having a value proportional to the weight applied to cushion 14.

Accumulator 50 is a flat plate structure that has a surface area proportional to the area on cushion 14 that requires weight detection and does not adversely affect the comfort level of occupant 16 sitting in the seat. A suitable material for the accumulator may be plastic with a thickness that does not adversely affect the comfort of an occupant sitting in the seat. An alternative embodiment may require an accumulator having a different shape and material that is dependent on seat construction, the foam material used for the seat cushion, the weight classification requirements that need to be met, and does not adversely affect the comfort of an occupant sitting in the seat. While the accumulator in the described embodiment is disposed spaced apart from the upper cushion surface of the seat cushion, it may be suitably disposed adjacent the upper cushion surface or disposed adjacent the lower cushion surface of the seat cushion or at any location within the seat cushion.

During operation as depicted in FIG. 1 and FIG. 2, in the absence of occupant 16, upper cushion surface 22 is shown in a non-deformed state. Thus, sensing element 38, rod 46, arm 44, and angle of rotation of shaft 30 on rotary sensor 28 are also in a first orientation. Magnet 36 in rotary sensor 28 is at a first orientation causing sensing element 38, preferably a Hall Effect sensor element 40 mounted to a printed circuit board 51, to generate an electrical output 32, as depicted in FIG. 3, which is a first voltage value proportional in response to the angle of rotation of the shaft. Printed circuit board 51 is secured to a housing 52 of rotary sensor 28 using screws or other suitable fastener. Electrical output 32 is operatively connected to controller 34. Controller 34 analyzes electrical output 32 along with other inputs and makes a decision to allow or not allow an air bag 54 to deploy for occupant 16 in seat 12. In the non-deformed state, rotary sensor 28 provides an electrical output 32 indicative of an empty seat that is indicative of no weight placed on seat surface 26 of cushion 14.

When occupant 16 sits in seat 12, upper cushion surface 22 is deformed as indicated by the dashed lines in FIG. 1. Accumulator 50 is forced downward along axis B as shown by dashed lines in relation to the weight of occupant 16 on upper cushion surface 22. As accumulator 50 deforms in response to the weight of occupant 16, rod 46 also moves to a deformed position shown by dashed lines in FIG. 1 and FIG. 2 in response to the weight. Arm 44 moves along axis B that varies the angle of rotation of shaft 30 in relation to the amount of weight on seat surface 26. The rotational movement of shaft 30 rotates magnet 36. Hall Effect sensor 40 detects the change of rotational movement of magnet 36 and generates an electrical output 32 having a second voltage value different from the first voltage value. The second voltage value is proportional to the weight of the occupant. The second voltage value is received by controller 34, as shown in FIG. 3 that utilizes electrical output 32 to determine appropriate safety measures, which may include arming of an air bag assembly to deploy for occupant 16 in seat 12.

When seat 12 is occupied by an empty child car seat or other object, cushion 14 is deformed less than by an adult occupant. Axial movement by linkage 42 is also less and electrical output 32 is different than for an adult occupant. Also, when a child car seat contains a child, cushion 14 is deformed an amount less than an adult occupant, the axial movement of linkage 42 less than for an adult occupant, and the electrical output 32 is different from an adult occupant.

While the invention is that of a seat assembly for discrimination between an occupant and other objects in a seat, the preferred embodiment shows discrimination between an occupant and other objects in a seat for occupant class discrimination to allow deployment of an air bag in a vehicle. The invention may also find use for detecting an occupant in a seat to initiate an audible or visual seat belt reminder to the occupant to buckle their seat belt.

The invention provides a reliable and robust sensing approach for detecting the weight of an occupant. The rotary sensor is mounted apart from the linkage and can be readily coupled to the linkage during assembly using conventional manufacturing techniques. This invention allows for flexibility of mounting configurations of the rotary sensor to accommodate limited space under a seat due to other obstacles or to allow for raising or lowering of a power seat (not shown) without changing the position of the magnet in the rotary sensor. The linkage and the accumulator can be readily incorporated into the seat cushion at low cost and do not interfere with the support of the occupant sitting in the seat. Seat cushion deformation is not restricted by the accumulator, thus maintaining seat comfort for the occupant. The invention is suitable for a variety of design applications without redesign. The rotary sensor can be accessed easily below the seat cushion on the seat frame that may allow consideration of a variety of mounting options for the best overall solution. Serviceability can be as easy as disconnecting the linkage from the rotary sensor and replacing the rotary sensor under the seat without removal of the seat cushion or the seat.

While this invention has been described in terms of the preferred embodiment thereof, it is not intended to be so limited, but rather only to the extent set forth in the claims that follow.

We claim:

1. A seat assembly adapted to be sat upon by an occupant and for detecting a weight of the occupant, said seat assembly comprising:

a seat cushion including a seat surface deformable in response to the weight;

a rotary sensor including a shaft rotatable about an axis and having an electrical output proportional in response to an angle of rotation of the shaft; and a linkage including a rod and an arm, said rod having a tip disposed within the seat cushion underlying the seat surface and movable in response to deformation of the seat surface, said rod being connected to said arm and said arm being connected to said shaft such that movement of the tip in response to the weight rotates the shaft.

2. The seat assembly of claim 1, wherein the seat surface is an upper cushion surface, and wherein the seat cushion includes a lower cushion surface opposite the upper cushion surface, and wherein the rotary sensor is disposed adjacent the lower cushion surface.

3. The seat assembly of claim 1, wherein the electrical output is a voltage having a value proportional to the weight.

4. The seat assembly of claim 1, wherein the rotary sensor comprises a magnet mounted on the shaft and a sensing element disposed stationary relative to movement of the shaft and suitable for detecting rotational movement of the magnet.

5. The seat assembly of claim 4, wherein the sensing element is a Hall Effect sensor.

6. The seat assembly of claim 4, wherein the magnet comprises a circular shape.

7. The seat assembly of claim 1, wherein the seat assembly comprises a plane, and the rod and the arm are disposed in the plane, and the shaft is perpendicular the plane being affixed to the arm.

8. The seat assembly of claim 1, wherein the tip includes an accumulator underlying the seat surface.

9. The seat assembly of claim 1, wherein the seat cushion includes an upper cushion surface and a lower cushion surface opposite the upper cushion surface, and a slit is disposed in the lower cushion surface thereat to receive the rod therein, and the rod connects to the arm and the arm connects to the shaft remote from the seat cushion.

10. The seat assembly of claim 1, wherein the electrical output is in communication with a controller, and the controller determines a deployment decision for an air bag system on a vehicle such that the deployment decision is made by the controller using occupant class discrimination based at least in part on the electrical output of the rotary sensor of the seat assembly.

11. The seat assembly of claim 1, wherein the electrical output is one of,
   (i) a resistance signal, and
   (ii) a digital output signal.

12. The seat assembly of claim 6, wherein a disposition of the linkage is configured to allow the circular-shaped magnet to be disposed in an overlying, spaced relationship with the sensing element, and the sensing element is disposed in an integrated circuit.

13. The seat assembly of claim 1, wherein the seat assembly is used to initiate a seat belt reminder to prompt the occupant to buckle a seat belt.

14. A seat assembly adapted to be sat upon by an occupant and for detecting a weight of the occupant, said seat assembly comprising:
   a seat cushion including a seat surface deformable in response to the weight;
   a rotary sensor including a shaft rotatable about an axis and having an electrical output proportional in response to an angle of rotation of the shaft; and
   a rod being formed of a single unitary piece and having a tip disposed within the seat cushion underlying the seat surface and movable in response to deformation of the seat surface, said rod connecting the tip directly to the shaft such that movement of the tip in response to the weight rotates the shaft.

\* \* \* \* \*